United States Patent
Ichikawa et al.

(10) Patent No.: US 6,940,939 B1
(45) Date of Patent: Sep. 6, 2005

(54) REACTOR STRUCTURAL MEMBER AND METHOD OF SUPPRESSING CORROSION OF THE SAME

(75) Inventors: Nagayoshi Ichikawa, Kawasaki (JP); Yukio Hemmi, Yokohama (JP); Tetsuo Oosato, Tokyo-to (JP); Junichi Takagi, Yokohama (JP); Kenji Yamazaki, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/599,027

(22) Filed: Jun. 22, 2000

(30) Foreign Application Priority Data

Jun. 23, 1999 (JP) .................................. 11-177512

(51) Int. Cl.⁷ .............................................. G21C 9/00
(52) U.S. Cl. ..................... 376/305; 376/305; 376/301
(58) Field of Search ............................... 376/306, 305, 376/301

(56) References Cited

U.S. PATENT DOCUMENTS

| | | | | |
|---|---|---|---|---|
| 4,297,150 A | * | 10/1981 | Foster et al. ................. 148/6.3 |
| 4,842,812 A | * | 6/1989 | Panson et al. ............... 376/306 |
| 4,927,598 A | * | 5/1990 | Nishino et al. .............. 376/306 |
| 5,028,384 A | * | 7/1991 | Skarpelos et al. ........... 376/306 |
| 5,377,245 A | * | 12/1994 | Uetake et al. ............... 376/305 |
| 5,602,888 A | * | 2/1997 | Hettiarachchi et al. ..... 376/305 |
| 5,608,766 A | * | 3/1997 | Andresen et al. ........... 376/305 |
| 5,715,290 A | * | 2/1998 | Uetake et al. ............... 376/306 |
| 5,768,330 A | * | 6/1998 | Andresen et al. ........... 376/301 |
| 5,774,516 A | * | 6/1998 | Hettiarachchi et al. ..... 376/305 |
| 5,793,830 A | * | 8/1998 | Kim et al. ................... 376/305 |
| 5,818,893 A | * | 10/1998 | Hettiarachchi .............. 376/305 |
| 5,904,991 A | * | 5/1999 | Hettiarachchi ........... 428/472.1 |

FOREIGN PATENT DOCUMENTS

| | | | |
|---|---|---|---|
| DE | 1021080 | * | 5/1997 |
| JP | 7-20282 | | 1/1995 |
| JP | 7-270592 | | 10/1995 |
| JP | 8-201578 | | 8/1996 |
| JP | 9-324253 | | 12/1997 |
| JP | 10-90482 | | 4/1998 |

* cited by examiner

Primary Examiner—Michael J. Carone
Assistant Examiner—Rick Palabrica
(74) Attorney, Agent, or Firm—Foley & Lardner LLP (57) ABSTRACT

A photocatalytic substance having the properties of an n-type semiconductor is deposited on a surface of a metal base made of a stainless steel or Inconel. When necessary, the hydrogen concentration of the reactor water is increased. A current produced by the photocatalytic substance when the same is irradiated with light or radioactive rays in a nuclear reactor flows through the metal base to reduce corrosion current. When necessary, the photocatalytic substance is provided on its surface with at least one of Pt, Rh, Ru and Pd.

18 Claims, 11 Drawing Sheets

REACTOR STRUCTURAL MEMBER AND METHOD OF SUPPRESSING CORROSION OF THE SAME

BACKGROUND OF THE INVENTION

1. Field of the Invention

The present invention relates to reactor structural members, namely, materials used for constructing a reactor, resistant to corrosion in a reactor primary system of a nuclear power plant, and a method of suppressing corrosion of reactor structural members.

2. Description of the Related Art

In a BWR power plant, reactor water contains oxygen and hydrogen peroxide produced by the radiolysis of water in a radiation field. It is known that oxygen and hydrogen peroxide contained in the reactor water cause intergranular stress-corrosion cracking (IGSCC) in the structural members of stainless steels and nickel-base alloys in an environment of the high-temperature, high-pressure water of nuclear reactors. Initiation of stress-corrosion cracks and propagation of cracks are dependent on corrosion potential. Reduction of oxygen and hydrogen peroxide reduces the corrosion potential of a member. The lower the corrosion potential, the lower is the possibility of crack initiation and propagation of cracks.

A hydrogen injection method that injects hydrogen through a feedwater system into a nuclear reactor to reduce oxygen and hydrogen peroxide contained in reactor water is a method that has been practically applied to prevent the stress-corrosion cracking in some domestic and foreign nuclear power plants. However, the hydrogen injection method is attended with an adverse effect caused by the reaction of injected hydrogen with N-16 produced by nuclear reaction to produce volatile ammonia. The volatile ammonia is liable to enter the steam system, which increases the dose rate of the turbine system. When hydrogen is injected through the feedwater system into the reactor water, oxygen must be injected to reduce excess hydrogen in the off-gas system by recombination and various facilities are necessary therefor.

A corrosion potential reducing method recently proposed to reduce the corrosion potential of structural members without causing those problems adds a noble metal, such as platinum, to the reactor water to deposit the noble metal on the surfaces of the structural members and reduces the corrosion potential by injecting a small amount of hydrogen into the reactor water. This corrosion potential reducing method utilizes the property of the noble metal, such as platinum, to selectively arrest the reversible reaction of hydrogen having a low potential with an intention to reduce the corrosion potential by injecting a small amount of hydrogen into the reactor water.

However, when this method is practiced in a nuclear power plant, the noble metal adheres also to a zirconium oxide film contained in the fuel, which promotes the oxidation and hydrogenation of the fuel material. Moreover, the interaction of hydrogen injected into the reactor water and N-16 produced by nuclear reaction is promoted, volatile ammonia enters the steam system and the dose rate of the turbine system increases.

Furthermore, since a noble metal chemical containing impurities is used in a high concentration, the quality of the reactor water is deteriorated adversely affecting the soundness of the fuel materials. Thus, the noble metal injection method now in use exerts adverse effects on the maintenance of water quality, the reduction of radioactivity transition and the enhancement of the degree of burn-up of the fuel. To reduce such adverse effects, it is desired to develop a method that injects a small amount of the noble metal and a method that uses a substance other than the noble metal.

On the other hand, ions contained in feedwater adheres as loose particles to the surfaces of members disposed within the nuclear reactor when the feedwater has a high iron concentration. If the noble metal adhering to the structural members adheres to those particles, the noble metal adheres to the fuel when the particles separates from the surfaces of the structural members and promotes the oxidation and hydrogenation of the fuel materials.

As mentioned above, when hydrogen is injected into the reactor water by the known stress-corrosion cracking preventing method, the hydrogen and N-16 produced by nuclear reaction interact to produce volatile ammonia. The volatile ammonia thus produced is liable to enter the steam system to increase the dose rate of the turbine system. Various facilities are necessary to reduce excess hydrogen in the off-gas system by recombination.

When a noble metal is deposited on the surfaces of structural members by the method that adds the noble metal to the reactor water to reduce the corrosion potential by injecting a small amount of hydrogen into the reactor water, the noble metal adheres also to the zirconium oxide films and the oxidation and hydrogenation of the fuel materials are promoted. Further more, since a noble metal chemical containing impurities is used in a high concentration, the quality of the reactor water is deteriorated adversely affecting the soundness of the fuel materials.

Ion contained in the feedwater adheres in loose particles to the surfaces of members disposed within the nuclear reactor when the feedwater has a high iron concentration. If the noble metal adhering to the structural members adheres to those particles, the noble metal adheres to the fuel when the particles separate from the surfaces of the structural members.

SUMMARY OF THE INVENTION

The present invention has been devised to solve those problems in the related art and it is an object of the present invention to provide a reactor structural member and a method of reducing corrosion of the reactor structural member capable of reducing the respective amounts of hydrogen and noble metal to be injected into the reactor water to prevent stress-corrosion cracking, of reducing the transfer of radioactivity to the turbine system, of reducing excess hydrogen in the off-gas system, of reducing the amount of a noble metal adhering to the surface of the fuel material to the least necessary extent, and of reducing the corrosion potential of members of the primary system of a nuclear reactor by suppressing the production of loose iron particles on the surface of the fuel without promoting the oxidation and hydrogenation of the fuel material.

According to the present invention, a reactor structural member has a surface provided with a corrosion potential reducing substance, such as a photocatalytic substance that produces electromotive force when exposed to light or radioactive rays in a nuclear reactor, a metal or a metal compound that forms such a photocatalytic substance under a condition specified by a temperature and a pressure in the nuclear reactor. Preferably, the corrosion potential reducing substance is formed as a particle having a surface provided with at least one of Pt, Rh, Ru and Pd.

The light in the nuclear reactor is a radiation including ultraviolet rays as a principal component, which is known as Cherenkov rays produced by the nuclear fission of a fuel material in a water-cooled nuclear reactor. The radioactive rays in a nuclear reactor are electromagnetic waves and corpuscular beams produced by the nuclear fission of the fuel material, such as α rays, β rays, γ rays and neutron beams.

The photocatalytic substance is a substance having a property of an n-type semiconductor, such as any one of compounds including $TiO_2$, $ZrO_2$, PbO, $BaTiO_3$, $Bi_2O_3$, ZnO, $WO_3$, $SrTiO_3$, $Fe_2O_3$, $FeTiO_3$, $KTaO_3$, $MnTiO_3$, and $SnO_2$. These compounds are stable in a high-temperature, high-pressure, radioactive environment, and do not significantly increase the migration of radioactivity to the turbine system, and do not significantly promote the oxidation and hydrogenation of the fuel material. The corrosion potential of the structural members of the primary system of a nuclear reactor can be controlled by attaching any one of those compounds to the structural members of the nuclear reactor or by forming a film of the compound on the surface of the structural members of the nuclear reactor. Preferably water quality is controlled. The radioactivity of the fuel material and the activated compound is low.

Among those compounds, $TiO_2$ and $ZrO_2$ are particularly preferable photocatalytic substances.

Although the compounds may be used in the form of oxides as mentioned above which are photocatalytic substances as they are, phtocatalyst forming substances that produce the foregoing compounds under a high-temperature, high-pressure condition in the nuclear reactor, more concretely, in an environment of 285° C. and 70 atm, such as metals and metal hydrates, may be used. More concretely, possible metals and metal hydrates are, for example, metal Ti, metal Zr, Ti hydrate and Zr hydrate.

Those photocatalytic substances or photocatalyst forming substances are used instead of the noble metal, such as Pt. Those photocatalytic substances and photocatalyst forming substances may be used as particles having surfaces on which at least one of Pt, Rh, Ru and Pd is partially attached.

The photocatalytic substance, the photocatalyst forming substance, the photocatalytic substance combined with a noble metal, such as Pt, or the photocatalyst forming substance combined with a noble metal, such as Pt, is attached to the surface of a structural member of a nuclear reactor. A film of the substance may be formed on the surface of a structural member of a nuclear reactor.

A method of securely attaching the corrosion potential reducing substance, i.e., the photocatalytic substance, the photocatalyst forming substance, the photocatalytic substance combined with a noble metal or the photocatalyst forming substance combined with a noble metal, to the surface of an objective structural member to be protected from corrosion supplies the corrosion potential reducing substance into the cooling water while the nuclear reactor is in rated operation, in a start-up stage, in a shut-down stage, while a plant loaded with the fuel is stopped without providing any thermal output or while the plant is not loaded with any fuel, and circulates the cooling water to coat the surface of the structural member of the nuclear reactor with the corrosion potential reducing substance.

The corrosion potential reducing substance may be sprayed over the surface of the objective structural member to form a film of the corrosion potential reducing substance in a thickness in the range of 0.1 to 1 μm by using a robot after removing the fuel from the nuclear reactor and decontaminating the nuclear reactor for periodic inspection. The film of the corrosion potential reducing substance having a predetermined thickness can be formed on the surface of the structural member by a method that sprays a liquid containing the corrosion potential reducing substance over the surface of the structural member in a film and drying the film, a thermal spraying method, a physical vapor deposition (PVD) method or a chemical vapor deposition (CVD) method.

When the corrosion potential reducing substance is applied to the surface of a structural member of a nuclear reactor after providing the same with a hydrophilic property or when a mixture prepared by mixing the corrosion potential reducing substance and a binder is applied to the surface of a structural member of a nuclear reactor, the initial adhesion of the corrosion potential reducing substance to the surface of the structural member can be enhanced.

Desirably, the amount of the corrosion potential reducing substance applied to the structural member or the thickness of a film of the corrosion potential reducing substance formed on the surface of the structural member is designed to make the photocatalytic substance produce a current of a current density not lower than the sum of the limiting current densities of oxygen and hydrogen peroxide contained in the reactor water.

When a corrosion oxide film formed on the surface of the structural member is a single layer of a p-type semiconductor, the corrosion potential reducing substance may be applied to the corrosion oxide film, or a film of the corrosion potential reducing substance may be formed on the corrosion oxide film. When a corrosion oxide film consists of an outer layer having the property of an n-type semiconductor other than a photocatalytic substance and an inner layer having the property of a p-type semiconductor, it is desirable to apply the corrosion potential reducing substance to the corrosion oxide film or to form a film of the corrosion potential reducing substance on the corrosion oxide film after making the outer layer of the n-type semiconductor unstable or removing the outer layer of the n-type semiconductor.

The outer layer of the n-type semiconductor other than the photocatalytic substance can be made unstable by a method that increases the hydrogen concentration of the reactor water. The outer layer of the n-type semiconductor other than the photocatalytic substance can be removed by a chemical decontaminating method, an electrolytic decontaminating method or a laser decontaminating method. When the outer layer of the n-type semiconductor is decontaminated by submerged laser irradiation, a compressive stress effective in preventing IGSCC can be induced in the structural member of the nuclear reactor by the decontaminating and peening action of a laser beam.

According to the present invention, it is desirable to control the iron concentration of the feedwater by placing a condensate purifier in the condensing system of the nuclear reactor to suppress the loose deposition of hematite on the surface of the fuel material. A suitable condensate purifier includes a filter device and a demineralizer device.

According to the present invention, to apply a noble metal effectively to the surface of a member of the primary system of a nuclear reactor and to limit the amount of the noble metal adhering to the surface of the fuel material to the least necessary extent, the iron concentration of the feedwater is adjusted to about 0.1 ppb or below to inhibit the formation of loose hematite on the fuel. When the iron concentration of the feedwater is about 0.1 ppb or below, nickel ion concentration is greater than 0.2 ppb. Under this condition, the amount of the noble metal to be injected into the nuclear reactor may be 1/10 of that of the noble metal used by the related art for the same purpose. The iron concentration of the feed water can be reduced to about 0.1 ppb or below by using the condensate purifier including the filter device and the demineralizer device.

It is desirable, while the iron concentration of the feed water is thus controlled, that one or some of Pt, Rh, Ru or Pd are made to adhere to the surface of the structural member of a nuclear reactor having a corrosion oxide film in a weight per unit area of 0.1 $\mu g/cm^2$ or above and water quality is controlled so that the oxygen/hydrogen molar ratio of the reactor water is in the range of 0.4 to 0.5.

The potential of the member can be reduced by a method that increases the hydrogen concentration of water. The hydrogen concentration of water can be increased by injecting hydrogen into the nuclear reactor or by injecting methanol that produces hydrogen in the nuclear reactor. To stabilize the catalyst and to maintain the effect of the catalyst, it is desirable to limit the iron concentration of the feedwater to 0.1 ppb or below.

The iron concentration of the feedwater can be reduced to 1 ppb or below by using the condensate purifier including the filter device and the demineralizer device. The performance of the filter device is important. A hollow fiber filter satisfies filtering requirements.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENTS

Generally, the iron concentration of feed water in BWR power plants in Japan is several hundreds parts per trillion (ppt) or above and in BWR power plants in America is 1000 ppt or above. Therefore, the amount of a noble metal per unit area necessary to stably control the potential of the structural members of the primary system of a nuclear reactor is several micrograms per square centimeters or above and hence one BWR needs several kilograms of a noble metal.

When any particles of corrosion products do not deposit from the reactor water on the surfaces of the structural members of the primary system, the necessary amount of a noble metal per unit area is on the order of 0.1 $\mu g/cm^2$ and hence one BWR needs 100 g or below of a noble metal.

Therefore, the amount of the noble metal that adheres to the fuel can be reduced to 1/10 of the amount of the noble metal necessary when particles of corrosion products deposit on the surfaces of the structural members of the primary system and the oxidation and hydrogenation of the fuel material can be prevented. Since the concentration of the noble metal chemical can be reduced to 1/10 of the concentration of the same necessary when particles of corrosion products deposit on the surfaces of the structural members of the primary system, the deterioration of water quality and the transfer of N-16 to the turbine system can be suppressed.

The reduction of the iron concentration of the feedwater brings about effects of stabilizing the adhesion of the noble metal to the surface of the structural member and maintaining the effect of the noble metal. Such effects can be exercised similarly when a photocatalyst is used.

The effect of the photocatalytic substance employed in the present invention, such as $TiO_2$ or $ZrO_2$, is the same as that of the noble metal in stopping hydrogen injection and reducing the amount of hydrogen to be injected into the nuclear reactor.

It is feared that a noble metal, such as Pt, attached to a part of the surface of the photocatalytic substance to enhance the effect of the photocatalytic substance, such as $TiO_2$, adheres to the surface of the fuel material and affects the oxidation and hydrogenation of the fuel material. However, the amount of the noble metal attached to the surface of the photocatalytic substance is 1/10 or below of the amount of the noble metal necessary when the noble metal is attached directly to the $ZrO_2$ film of the fuel material. Therefore, the influence of the noble metal on the fuel material is practically negligible.

Weld Ni-base alloy, for which corrosion is a significant problem, lies in the bottom section of a reactor vessel of a BWR plant. The depth of water to the bottom section is 5.3 m at the maximum. Since about 10% of ultraviolet rays included in Cherenkov rays reaches the bottom section, a sufficient amount of photons necessary for exciting the photocatalyst reaches the reactor structural members facing the reactor core.

A $TiO_2$ photocatalyst, i.e., an n-type semiconductor, has electrochemical properties similar to those of $ZrO_2$. It is known that the $TiO_2$ catalyst exercises its photocatalytic effect to promote anodic reaction and its corrosion potential drops. It is known that the corrosion potential of a $Cr_2O_3$ film and a NiO film, i.e., corrosion oxide films, formed on the surface of the weld Ni-base alloy rises when the same are p-type semiconductors.

To lower the potential of the member for IGSCC corrosion suppression, a $TiO_2$ photocatalyst, which is an n-type semiconductor, is applied to the corrosion oxide film formed on the surface of the molten Ni-base alloy to shield the corrosion oxide film, which is a p-type semiconductor, from Cherenkov rays to suppress the rise of potential, and the potential of the Ni-base alloy can be lowered by the effect of reduction of the corrosion potential of the $TiO_2$ photocatalyst.

The $TiO_2$ photocatalyst has a high photocatalytic effect on an Fe-base alloy on which an $Fe_2O_3$ film, which is an n-type semiconductor film, is formed as an outer layer, such as a stainless steel. Therefore, the corrosion potential can be lowered by selectively using a suitable photocatalytic substance.

When an Fe-base alloy on which an inner layer of a p-type semiconductor and an outer layer of an n-type semiconductor are formed, such as a stainless steel, is used, the n-type semiconductor of an oxide forming the outer layer is made unstable to expose the p-type semiconductor of an oxide in a contact interface by increasing the hydrogen concentration of the reactor water, or the n-type semiconductor of an oxide forming the outer layer can be removed by decontamination. The corrosion potential of the member can be further lowered by bringing the p-type semiconductor of an oxide, and an n-type semiconductor, such as $TiO_2$, i.e., a powerful photocatalytic substance, into contact.

When the intensity of a laser beam in water is increased to remove the oxide film, a compressive stress effective in preventing IGSCC can be induced in the structural member of the nuclear reactor by the peening effect of the laser beam.

When it is necessary to suppress IGSCC by lowering the corrosion potential of Fe-base and Ni-base alloy members by using a photocatalytic substance, such as $TiO_2$, the effect of the photocatalytic substance is further enhanced by increasing the hydrogen concentration of the reactor water, because dissolved oxygen is more active in receiving electrons than hydrogen ions. Therefore, it is effective to reduce dissolved oxygen by increasing the hydrogen concentration of the reactor water. It is desirable to inject a molar amount of oxygen corresponding to 1/2 of the molar amount of hydrogen to be injected into a system after the steam system to make oxygen and excess hydrogen interact.

Under conditions simulating water quality control in a practical plant, it was found that the corrosion potential could be lowered to −230 mV vs SHE effective in suppressing IGSCC by using feedwater having a hydrogen concentration in the range of 0.2 to 0.4 ppm when $TiO_2$ combined with Pt and $TiO_2$ as a phtocatalyst are applied to a part of the surface of a weld Ni-base alloy in a 1 $\mu$m thick film. When the hydrogen concentration is in that range the migration of radioactivity to the turbine system does not increase.

When applying the photocatalytic substance to a member for which corrosion must be suppressed, it is important to avoid the adhesion of the photocatalytic substance to the fuel material, to control the thickness of the film of the photocatalytic substance, and to suppress thermal influence on the member to the least extent.

A photocatalytic substance or a photocatalyst forming substance can be applied to a member for which corrosion must be suppressed by circulating cooling water while the plant loaded with the fuel is stopped without providing any thermal output or while the fuel is taken out and immersed in cooling water. The photocatalytic substance or the photocatalyst forming substance may be sprayed over the surface of an objective structural member by using a robot after removing the fuel from the nuclear reactor and decontaminating the nuclear reactor for periodic inspection.

A film of the photocatalytic substance or the photocatalyst forming substance having a predetermined thickness can be formed on the surface of the structural member by a method that sprays a liquid containing the same substance over the surface of the structural member in a film and drying the film, a thermal spraying method, a PVD method or a CVD method.

When a photocatalytic substance, such as $TiO_2$, is applied to the surface of a structural member after providing the same with a hydrophilic property or when a mixture prepared by mixing the photocatalytic substance and a binder, such as $SiO_2$ is applied to the surface of a structural member, the initial adhesion of the photocatalytic substance to the surface of the structural member can be enhanced.

A $TiO_2$ film of a thickness in the range of a fraction of 0.1 $\mu$m to 1 $\mu$m is capable of completely absorbing Cherenkov rays and has a sufficient mechanical strength.

Figure 1:
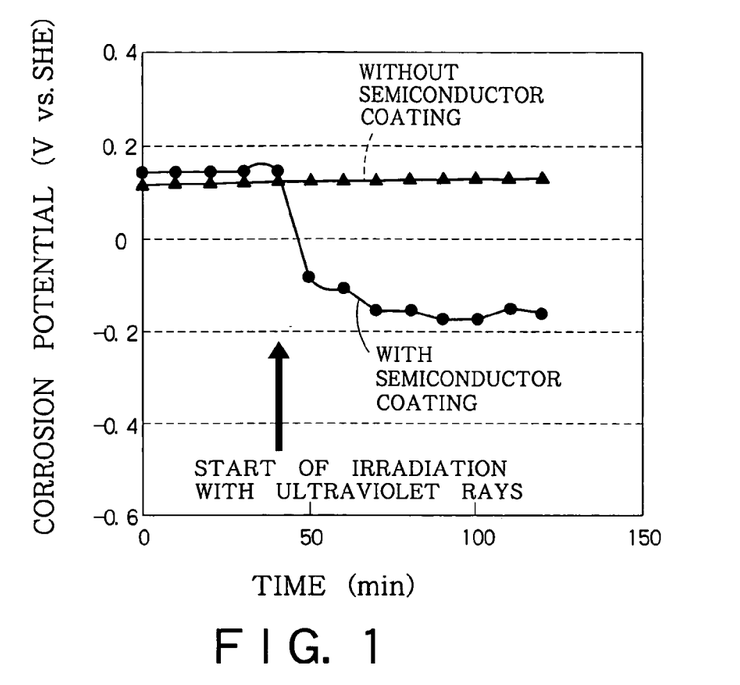
FIG. 1 is a graph showing the variation with time of the corrosion potential of a structural member of a stainless steel (SUS304, JIS) coated with a $TiO_2$ film when exposed to ultraviolet rays.

FIG. 1 is a graph showing the variation with time of the corrosion potential of a heat-affected part of a structural member of a stainless steel (SUS304, JIS) coated with a $TiO_2$ film by thermal spraying when the heat-affected part is exposed to ultraviolet rays. In FIG. 1, both the variation of the corrosion potential of the heat-affected zone coated with the $TiO_2$ film and that of a part not coated with any film are shown. As obvious from FIG. 1, the corrosion potential of the heat-affected zone coated with the $TiO_2$ film decreases when the heat-affected zone is irradiated with ultraviolet rays. The corrosion potential of the zone not coated with any $TiO_2$ film does not decrease when the same part is irradiated with ultraviolet rays. Thus, it is known that the $TiO_2$ film formed by thermal spraying cause the corrosion potential to decrease.

Figure 2:
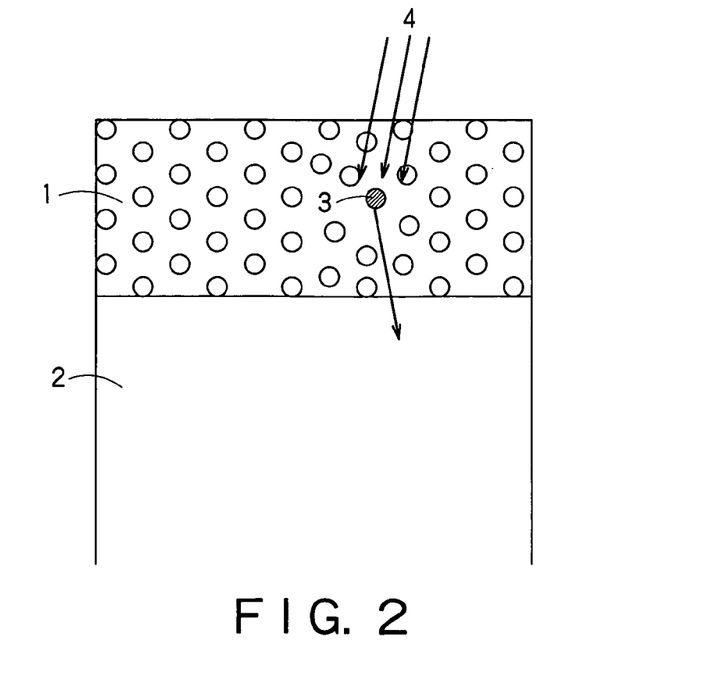
FIG. 2 is a typical view of assistance in explaining a reaction that occurs when a metal base coated with an n-type semiconductor film is exposed to light rays, such as ultraviolet rays.

FIG. 2 is a typical view of assistance in explaining a reaction that occurs when a metal base 2 of a stainless steel or Inconel coated with an n-type semiconductor film 1 is exposed to light rays, such as ultraviolet rays. As shown in FIG. 2, the n-type semiconductor film 1 has locally unbonded surplus electrons 3. When the n-type semiconductor film 1 is irradiated with effective light rays 4, such as ultraviolet rays, the n-type semiconductor forming the n-type semiconductor film 1 is excited. Consequently, electrons are allowed to move easily, migrate from the n-type semiconductor film 1 to the metal base 2 and are thus dissipated. This reaction makes anode current flow easily, so that the corrosion potential decreases.

Figure 3:
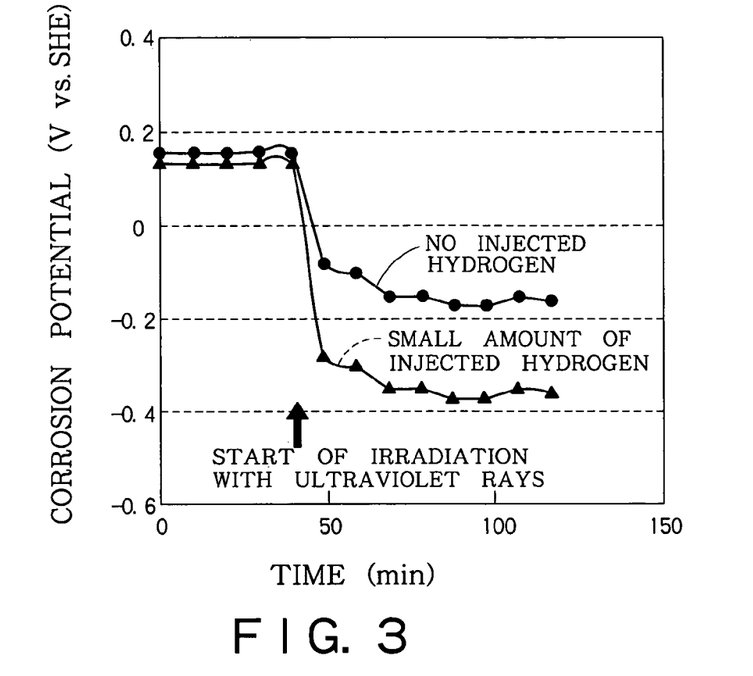
FIG. 3 is a graph showing the variation with time of the corrosion potential of a structural member of a stainless steel (SUS304, JIS) coated with a $TiO_2$ film when exposed to ultraviolet rays for the amount of hydrogen injected into a nuclear reactor.

FIG. 3 is a graph showing the variation with time of the corrosion potential of a structural member of a stainless steel (SUS304, JIS) coated with a $TiO_2$ film when exposed to ultraviolet rays for an amount of hydrogen injected into reactor water. The corrosion potential of the structural member of SUS304 decreases when the structural member is irradiated with ultraviolet rays under a condition where hydrogen is not injected into the reactor water. However, when the structural member is irradiated with ultraviolet rays under a condition where hydrogen is injected into the reactor water, the corrosion potential of the structural member of SUS304 decreases more effectively.

Figure 4:
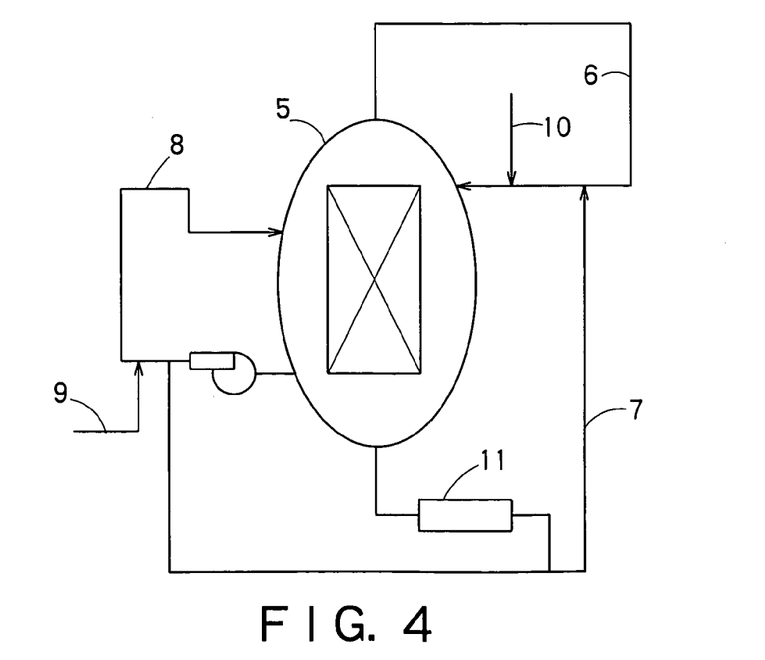
FIG. 4 is a diagrammatic view of a BWR nuclear plant.

FIG. 4 is a diagrammatic view of a BWR nuclear plant including a pressure vessel 5, a feedwater line 6, a purifying system 7 and a recirculation line 8. A recirculation system injection line 9 is connected to the recirculation line 8 and a feedwater system injection line 10 is connected to the feedwater line 6. A corrosion potential measuring apparatus 11 is installed. A semiconductor composition can be injected into the reactor water.

The reactor water is supplied through the recirculating line 8 to the corrosion potential measuring apparatus 11. The corrosion potential measuring apparatus 11 measures corrosion potential in the high-temperature reactor water. When applying a p-type semiconductor to a reactor structural member, the injection lines 9 and 10 for injecting a semiconductor composition into the reactor water are actuated to inject the semiconductor composition into the reactor water. The semiconductor composition may be injected into the reactor water while the nuclear reactor is in normal operation, while the nuclear reactor is stopped or while the nuclear reactor is in a start-up stage, provided that an objective part of the reactor structural member to be subjected to corrosion potential reduction is exposed to the reactor water. The relation between injection time, temperature and concentration may be determined beforehand through experiments and the relation may be used for controlling a semiconductor composition injecting operation or the semiconductor composition injecting operation may be controlled by monitoring the process of the semiconductor composition injecting operation by the corrosion potential measuring apparatus and the semiconductor composition may be injected into the reactor water confirming the reduction of corrosion potential.

Although the semiconductor composition is injected into the reactor water through the recirculation system in this embodiment, the semiconductor composition may be injected into the reactor water through any part connected to the nuclear reactor, such as a feedwater system, a residual heat removing system, a nuclear reactor cleaning system, a sampling line or the like. The semiconductor composition may be introduced into the nuclear reactor by a method that holds a sintered semiconductor composition compact that discharges a semiconductor composition when irradiated with ultraviolet rays in the reactor water.

Figure 5:
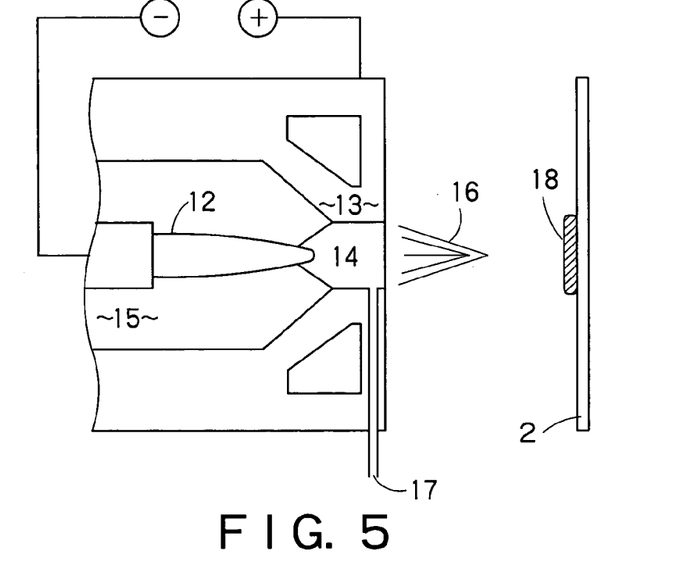
FIG. 5 is a typical view of assistance in explaining a method of forming a film on the surface of a metal base by a plasma spraying apparatus.

FIG. 5 is a typical view of assistance in explaining a method of forming a film on the surface of a metal base by a plasma spraying apparatus. A dc arc 14 is produced between a cathode 12 and an anode nozzle 13. An orifice gas 15 supplied from behind the cathode 12 is heated and expanded by the dc arc 14, and a plasma jet 16 is jetted through the anode nozzle 13. Powder 17 of a thermal spray material is carried by a gas into the plasma jet 16. The powder 17 of the thermal spray material is heated, is accelerated by the plasma jet 16 and impinges on a surface of a metal base 2 to form a photocatalyst film 18 on the surface of the metal base 2.

Figure 6:
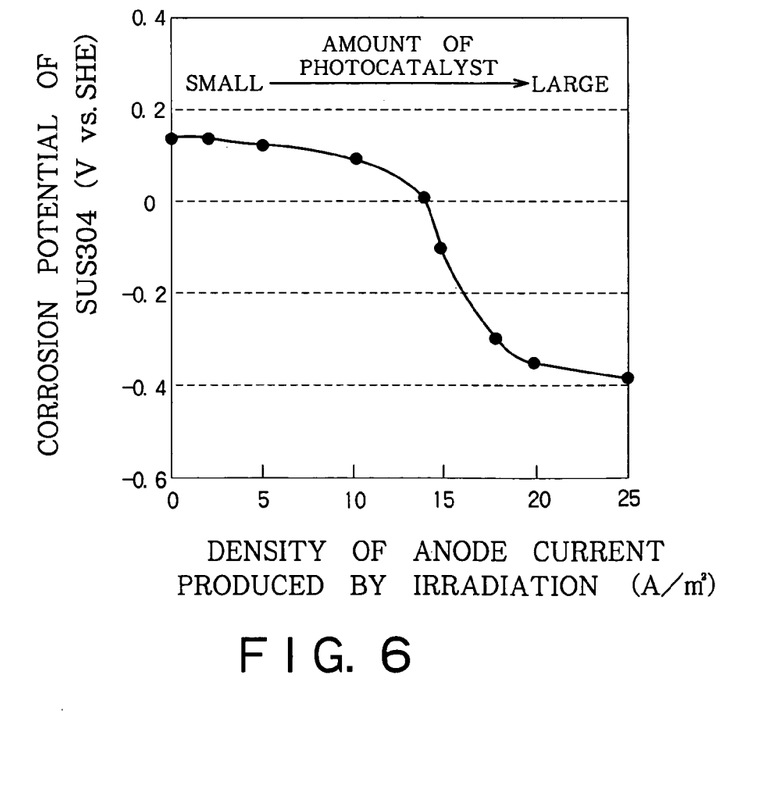
FIG. 6 is a graph showing the variation of the corrosion potential of a structural member of a stainless steel (SUS304, JIS) coated with a semiconductor film when the structural member is exposed to ultraviolet rays.

FIG. 6 is a graph showing the variation of the corrosion potential of a structural member of a stainless steel (SUS304, JIS) coated with a semiconductor film when the structural member is exposed to ultraviolet rays. An anode current produced by the photoelectrochemical reaction of a semiconductor must be higher than a cathode limiting current density, i.e., the density of a cathode current produced by the oxidizing components, such as oxygen and hydrogen peroxide, of the reactor water to reduce the corrosion potential. The anode current produced by the photoelectrochemical reaction of the semiconductor is dependent on the intensity of light and the mass of deposit per unit area of the semiconductor composition. The cathode current is dependent on the concentration of the oxidizing materials, such as oxygen and hydrogen peroxide, contained in the reactor water. For example, it is estimated that oxygen concentration and hydrogen peroxide concentration in a bottom part of the nuclear reactor are 200 ppb. A limiting current density of the cathode current resulting from the oxidizing substances calculated taking into account the amount of the oxidizing substances and flow conditions in the bottom part of the nuclear reactor is about 18 $A/m^2$. To reduce corrosion potential, the anode current must be higher than about 18 $A/m^2$. When a current of 18 $A/m^2$ or higher is produced by the photoelectrochemical reaction, corrosion potential decreases.

Figure 7:
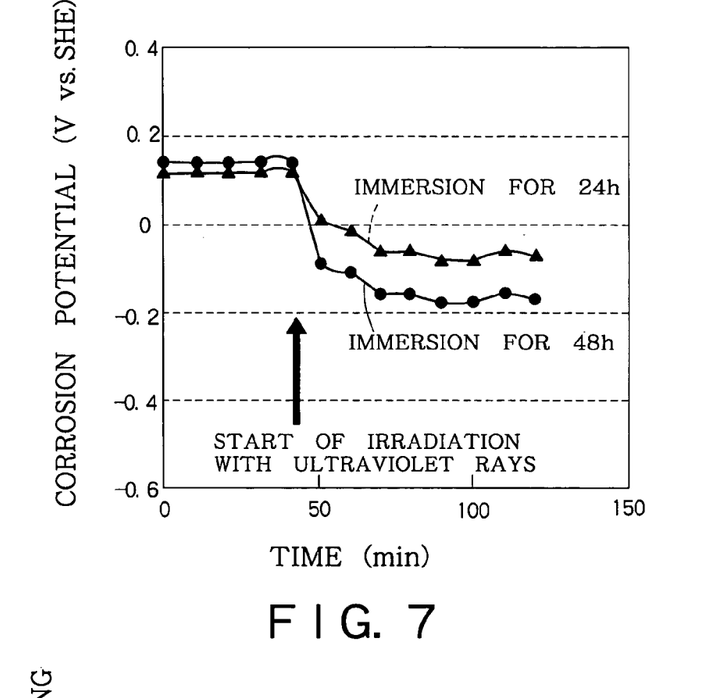
FIG. 7 is a graph showing the variation with time of the corrosion potential of a structural member of a stainless steel (SUS304, JIS) coated with an oxide film when exposed to ultraviolet rays.

FIG. 7 is a graph showing the variation with time of the corrosion potential of a structural member of a stainless steel (SUS304, JIS) coated with an oxide film containing a semiconductor composition when exposed to ultraviolet rays. The oxide film takes in the semiconductor composition as it grows on the surface of the structural member.

This method, instead of directly applying a semiconductor composition to a structural member of a nuclear reactor, dissolves or suspends a semiconductor composition in the reactor water and leaves the reactor water as it is for a fixed time to make the semiconductor composition adhere to the surface of the structural member.

Test pieces for the measurement of data shown in FIG. 7 were prepared by immersing pieces of a stainless steel (SUS304, JIS) in a high-temperature titanium oxide solution to form a $TiO_2$ film on the surfaces of the pieces. As obvious from FIG. 7, the corrosion potential of the test pieces decreases when the same are irradiated with ultraviolet rays, and the reduction of the corrosion potential increases with immersing time.

Figure 8:
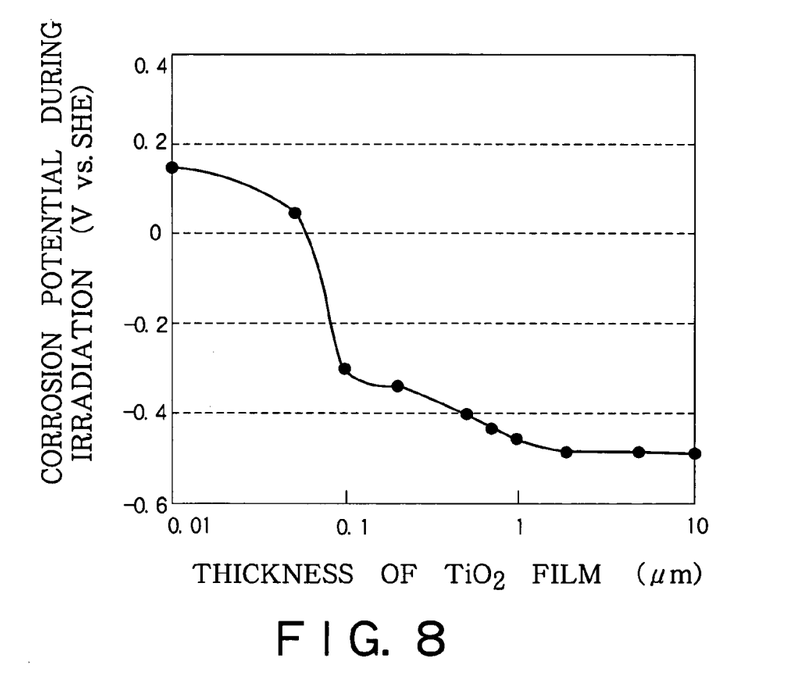
FIG. 8 is a graph showing the dependence of the corrosion potential of a structural member of a stainless steel (SUS304, JIS) coated with a $TiO_2$ film on the thickness of the $TiO_2$ film.

FIG. 8 is a graph showing the dependence of the corrosion potential of a structural member of a stainless steel (SUS304, JIS) coated with a $TiO_2$ film on the thickness of the $TiO_2$ film. The corrosion potential starts decreasing when the thickness of the $TiO_2$ film increases to 0.1 μm, and the curve indicating the variation of the corrosion potential with the thickness of the $TiO_2$ film levels off after the thickness increases beyond 1 μm. Therefore, the effective thickness of the $TiO_2$ film is in the range of 0.1 to 1 μm. It goes without saying that the $TiO_2$ film of a thickness not smaller than 1 μm reduces the corrosion resistance effectively.

Figure 9:
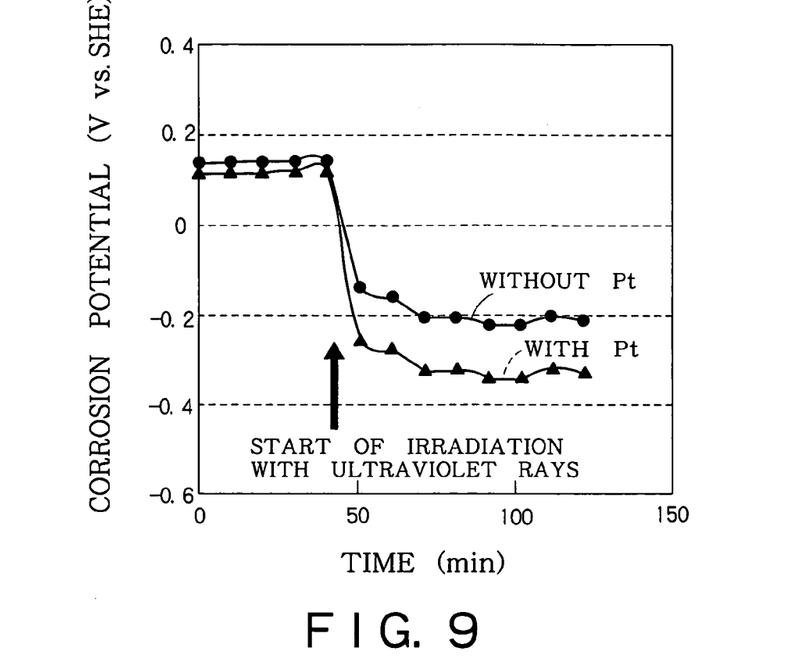
FIG. 9 is graph of assistance in explaining the effect of a small amount of Pt made to adhere to a $TiO_2$ film formed on a surface of a structural member of a stainless steel (SUS304, JIS) on reducing corrosion potential when the structural member is exposed to ultraviolet rays.

FIG. 9 is graph of assistance in explaining the effect of Pt made to adhere in a mass per unit area of 0.1 μg/cm$^2$ to a $TiO_2$ film formed on a surface of a structural member of a stainless steel (SUS304, JIS) on reducing corrosion potential when the structural member is exposed to ultraviolet rays. As obvious from FIG. 9, Pt added to the $TiO_2$ film is effective in increasing the reduction of the corrosion potential. Data shown in FIG. 9 proves that the addition of Pt to the $TiO_2$ film enhances the corrosion potential reducing efficiency of the $TiO_2$ film.

Figure 10:
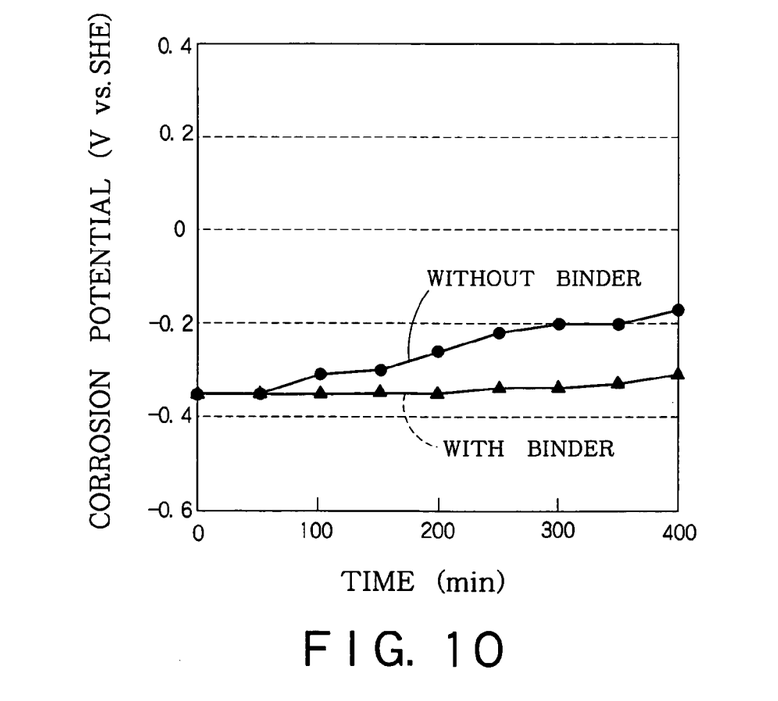
FIG. 10 is a graph of assistance in explaining the effect of $SiO_2$ used as a binder in forming a $TiO_2$ film on a structural member on corrosion potential.

FIG. 10 is a graph of assistance in explaining the effect of $SiO_2$ used as a binder in forming a $TiO_2$ film on a structural member on corrosion potential. When any binder is not used, the mass per unit area of the $TiO_2$ film decreases with time and, consequently, the corrosion potential increases with time. When a binder is used, the adhesion of the $TiO_2$ film to the surface of the structural member increases and the corrosion potential is held on a low level. It is known from FIG. 10 that the addition of a binder to the catalyst is effective in maintaining corrosion potential reducing ability.

Figure 11:
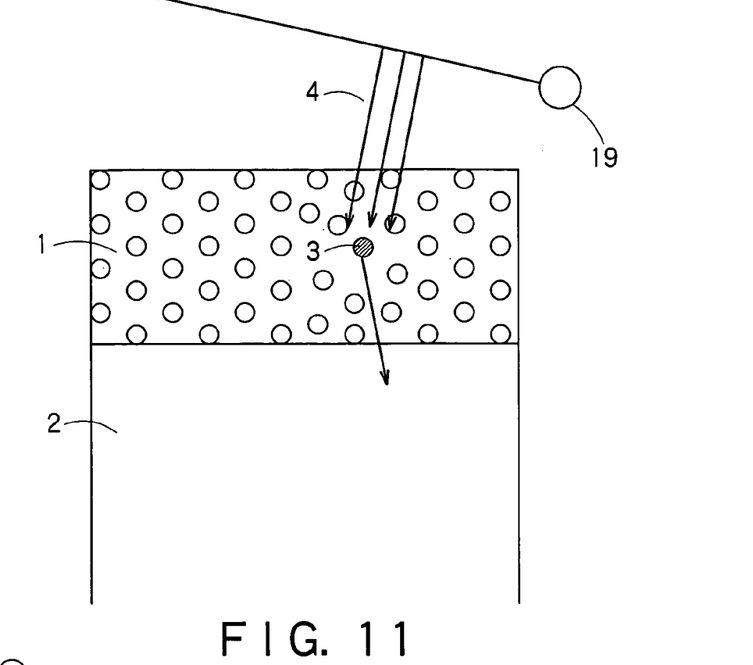
FIG. 11 is a typical view of assistance in explaining the migration of surplus electrons from an n-type semiconductor to a metal base caused by Cherenkov rays.

FIG. 11 is a typical view showing the migration of surplus electrons 3 from an n-type semiconductor 1 to a metal base 2 caused by Cherenkov rays. Many charged particles 19 are flying about in a nuclear reactor. It is generally known that light rays 4 called Cherenkov radiation are produced when the charged particles are decelerated. Cherenkov radiation has wavelengths in a wide wavelength range owing to difference in energy between the decelerated charged particles. Cherenkov radiation includes rays of wavelengths in the ultraviolet region. Therefore, it is considered that Cherenkov radiation is able to excite photocatalysts.

Figure 12:
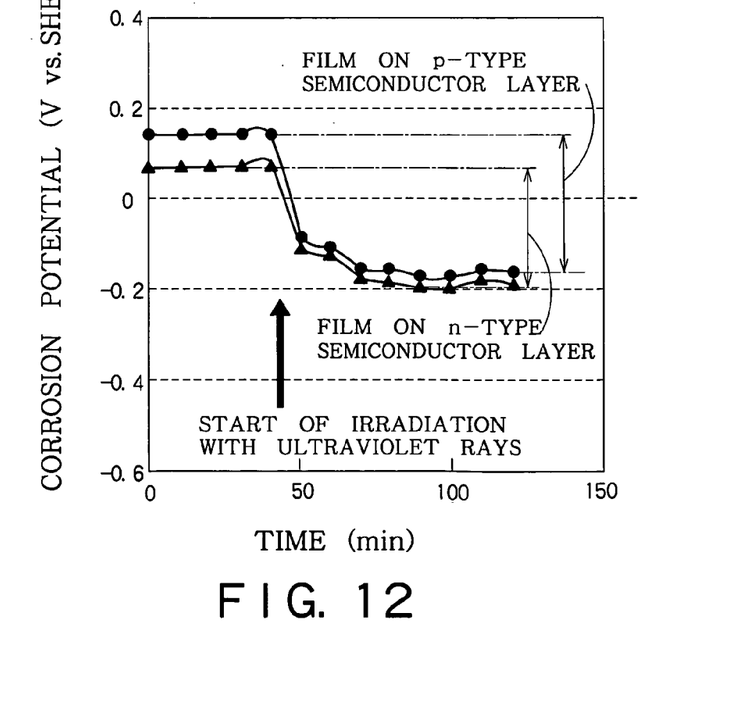
FIG. 12 is a graph showing the variation with time of the corrosion potential of a member of a stainless steel (SUS304, JIS) coated with a $Cr_2O_3$ film of a p-type semiconductor film, and having a $TiO_2$ film formed on the $Cr_2O_3$ film and that of a member of a stainless steel (SUS304, JIS) coated with an $Fe_2O_3$ film of an n-type semiconductor film, and having a $TiO_2$ film formed on the $Fe_2O_3$ film when irradiated with ultraviolet rays.
Figure 13:
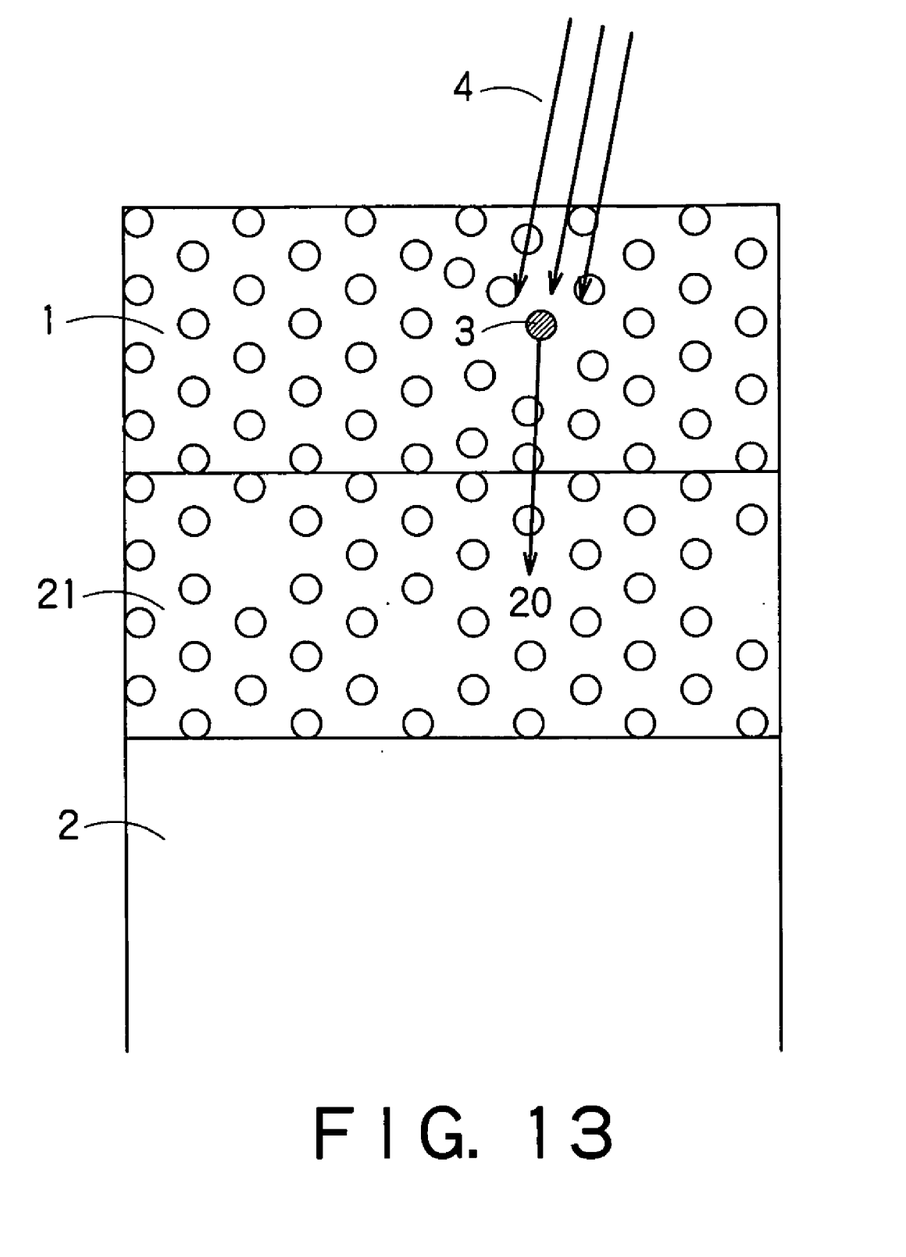
FIG. 13 is a typical view of assistance in explaining the difference in reaction between a member of a stainless steel (SUS304, JIS) coated with a $Cr_2O_3$ film of a p-type semiconductor film, and having a $TiO_2$ film formed on the $Cr_2O_3$ film and that of a member of a stainless steel (SUS304, JIS) coated with an $Fe_2O_3$ film of an n-type semiconductor film and having a $TiO_2$ film formed on the $Fe_2O_3$ film when irradiated with ultraviolet rays.

FIG. 12 shows the variation with time of the corrosion potential of a member of a stainless steel (SUS304, JIS) coated with a $Cr_2O_3$ film of a p-type semiconductor film, and having a $TiO_2$ film formed on the $Cr_2O_3$ film and that of a member of a stainless steel (SUS304, JIS) coated with a $Fe_2O_3$ film of an n-type semiconductor, and having a $TiO_2$ film formed on the $Fe_2O_3$ film when irradiated with ultraviolet rays. The respective corrosion potentials of both the members are reduced when irradiated with ultraviolet rays, which verifies the effect of the $TiO_2$ film on the reduction of corrosion potential. The corrosion potential reducing effect of the combination of the $TiO_2$ film and the p-type semiconductor film is greater than that of the combination of the $TiO_2$ film and the n-type semiconductor film. FIG. 13 is a typical view of assistance in explaining the principle of a phenomenon illustrated by FIG. 12. Whereas an n-type semiconductor film 1 locally has surplus electrons 3, a p-type semiconductor film 21 locally has unfilled bonds 20. The surplus electrons 3 of the n-type semiconductor film 1 excited by light rays 4 migrate easily into the unfilled bonds 20 of the p-type semiconductor film 21 contiguous with the n-type semiconductor film 1. The easiness of the migration of the electrons 3 into the p-type semiconductor film 21 is higher than that of electrons into the metal base 2 in which electrons are arranged regularly. Thus, the easiness of flow of anode current is promoted by forming a p-type semiconductor film on an n-type semiconductor film, and the reduction of corrosion potential by the formation of the $TiO_2$ film on the p-type semiconductor film is greater than that of the same by the formation of the $TiO_2$ film directly on the metal base 2.

Figure 14A:
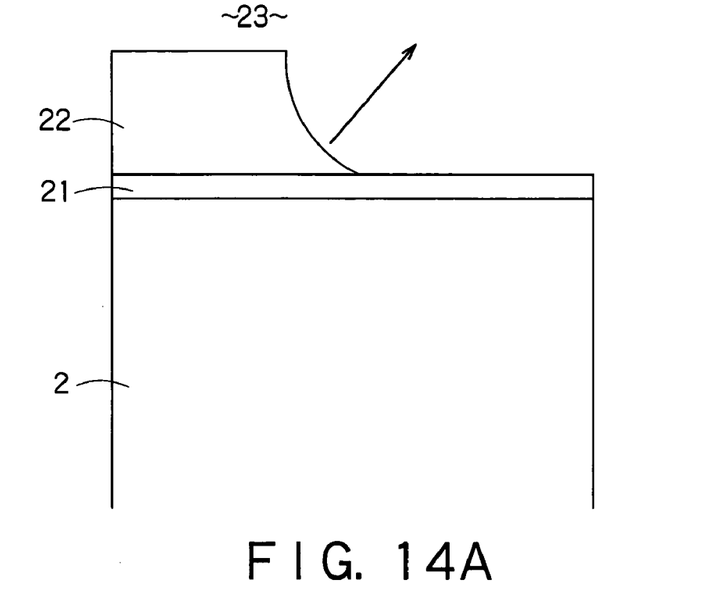
FIGS. 14A and 14B are typical views of assistance in explaining a method of forming a photocatalyst film on a member having a metal base, a p-type semiconductor film formed on the metal base, and an n-type semiconductor film, which is not a photocatalyst film, formed on the p-type semiconductor film after removing the n-type semiconductor film.
Figure 14B:
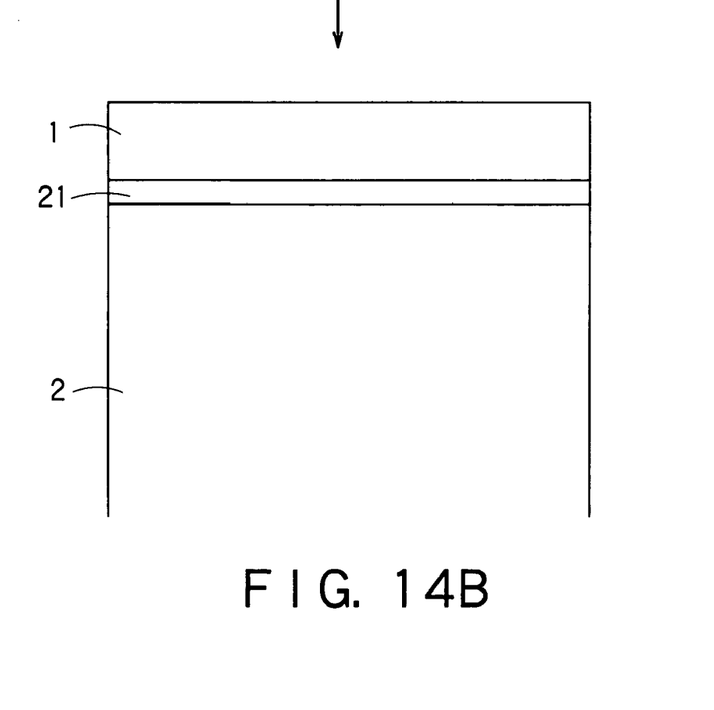

FIGS. 14A and 14B are typical views of assistance in explaining a method of forming an n-type semiconductor film 1, i.e., a photocatalyst film, on a member having a metal base 2, a p-type semiconductor film 21 formed on the metal base 2, and an n-type-semiconductor film 22, which is not a photocatalyst film, formed on the p-type semiconductor film after removing the n-type semiconductor film 22. This arrangement of the p-type semiconductor film and the n-type semiconductor film 1, i.e., a catalytic film, enhances the corrosion potential reducing effect. Only the n-type semiconductor film 22, which is not a photocatalyst film, can be removed by a method that makes the n-type semiconductor film 22 unstable by injecting a large quantity of hydrogen into the reactor water 23 to reduce dissolved oxygen. Only the n-type semiconductor film 22, which is not a photocatalyst film, can be removed by a decontamination process. The corrosion potential reducing effect of the n-type semiconductor film 1, i.e., the photocatalyst film, is enhanced when the same is formed on the p-type semiconductor film 21 after removing the n-type semiconductor film 22.

Figure 15:
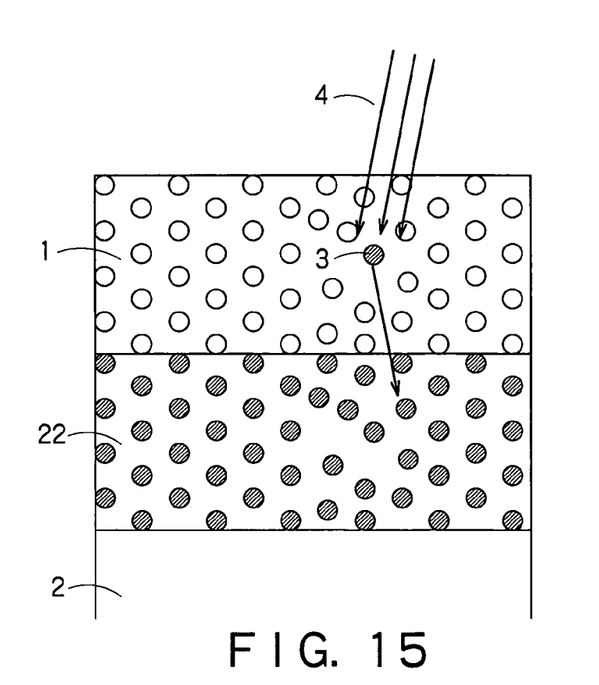
FIG. 15 is a typical view of assistance in explaining a reason that it is desirable, when a member has a metal base, a p-type semiconductor film formed on the metal base, and an n-type semiconductor film, which is not a photocatalyst film, formed on the p-type semiconductor film, to remove the n-type semiconductor film, which is not a photocatalytic film, and to form an n-type semiconductor film, which is a photocatalyst film, on the p-type semiconductor film.

FIG. 15 is a typical view of assistance in explaining a reason that it is desirable to remove the n-type semiconductor film 22, which is not a photocatalyst film, formed on the p-type semiconductor film 21 shown in FIGS. 14A and 14B. When the n-type semiconductor film 1, which is a photocatalyst film, on the n-type semiconductor film 22, which is not a photocatalyst film, surplus electrons 3 excited by light rays 4 must be dissipated in the n-type semiconductor film 22 having many surplus electrons 3. The easiness of receiving surplus electrons by the n-type semiconductor film 22 is inferior to that by not only the p-type semiconductor film but also the metal base 2. The effect of the photocatalyst film is reduced greatly when the n-type semiconductor film 22 underlies the catalyst film.

Figure 16:
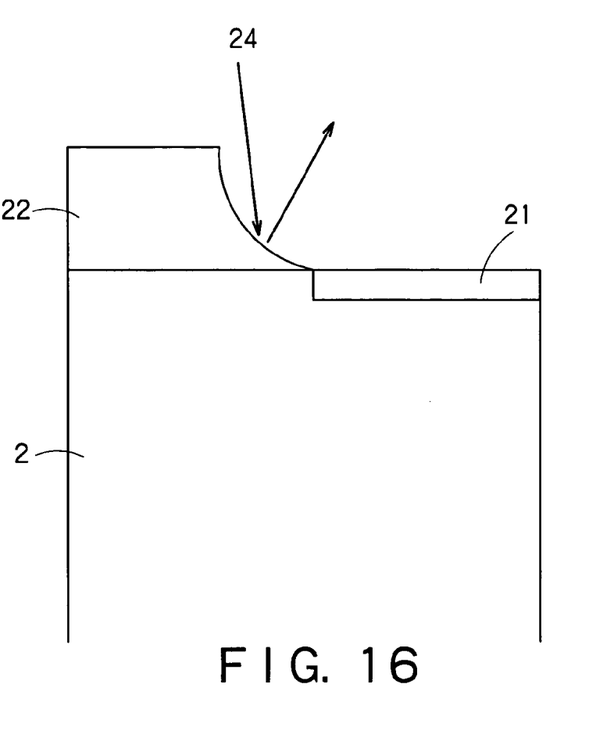
FIG. 16 is a typical view of assistance in explaining, when a member has a metal base and an n-type semiconductor film, which is not a photocatalyst film, a process of forming a p-type semiconductor film on the metal base by a chemical reaction after the n-type semiconductor film has been removed by chemical decontamination or electrolytic decontamination.

FIG. 16 is a typical view of assistance in explaining, when a member has a metal base 2 and an n-type semiconductor film 22, which is not a photocatalyst film, a process of forming a p-type semiconductor film 21 on the metal base 2. When the n-type semiconductor film 22 is removed by chemical or electrolytic decontamination, the p-type semiconductor film 21 grows on the metal base 2 by a chemical reaction. When the n-type semiconductor film 22 is removed by laser decontamination, only Cr can be selectively left unremoved by using laser light 24 of a proper wavelength. Since a chromium oxide forms a p-type semiconductor, only the p-type semiconductor film 21 remains on the surface of the metal base 2. An n-type semiconductor film, i.e., a catalyst film, is formed on the p-type semiconductor film 21. The n-type semiconductor film overlying the p-type semiconductor film 21 exercises a high corrosion potential reducing effect.

Figure 17:
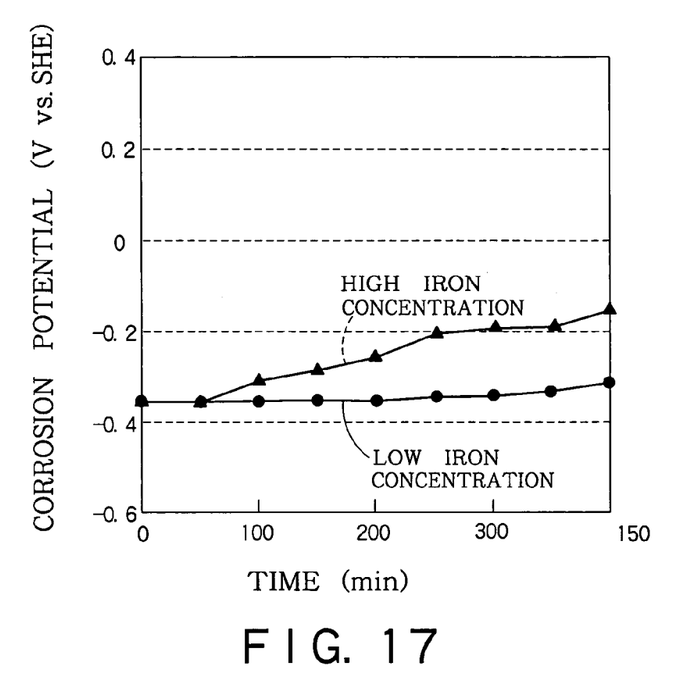
FIG. 17 is a graph showing the relation between the amount of a noble metal attached to the surface of a structural member of a nuclear reactor, corrosion potential and the iron concentration of reactor water.

FIG. 17 is a graph showing the relation between the amount of a noble metal attached to the surface of a structural member of a nuclear reactor, corrosion potential and the iron concentration of reactor water. As obvious from FIG. 17, when the reactor water has a high iron concentration, the effect of the noble metal is low and corrosion potential increases with time. Such a variation of corrosion potential occurs also when a $TiO_2$ film is used. It is known from data shown in FIG. 17 that the reduction of the iron concentration of the reactor water is effective in reducing corrosion potential by the present invention.

Figure 18:
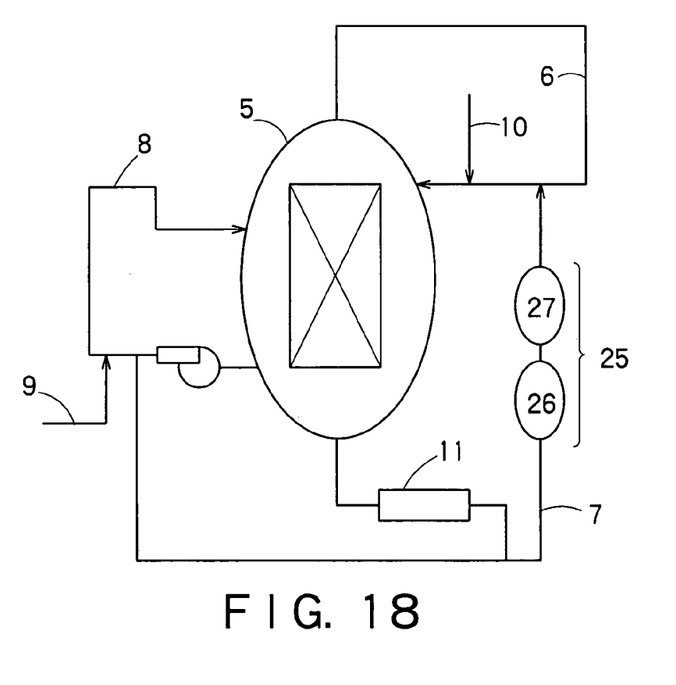
FIG. 18 is a diagrammatic view of a BWR nuclear plant with a feedwater purifier.

FIG. 18 shows a nuclear plant with a feedwater purifier by way of example, in which parts like or corresponding to those shown in FIG. 4 are denoted by the same reference characters and the description thereof will be omitted. The iron concentration of the feedwater must be limited to a very small value to suppress the loose deposition of hematite on the surface of the fuel. To reduce the iron concentration of the feed water to a very small value, a purifier 25 needs to have a prefilter device 26 and a demineralizer device 27 in a serial arrangement.

Figure 19:
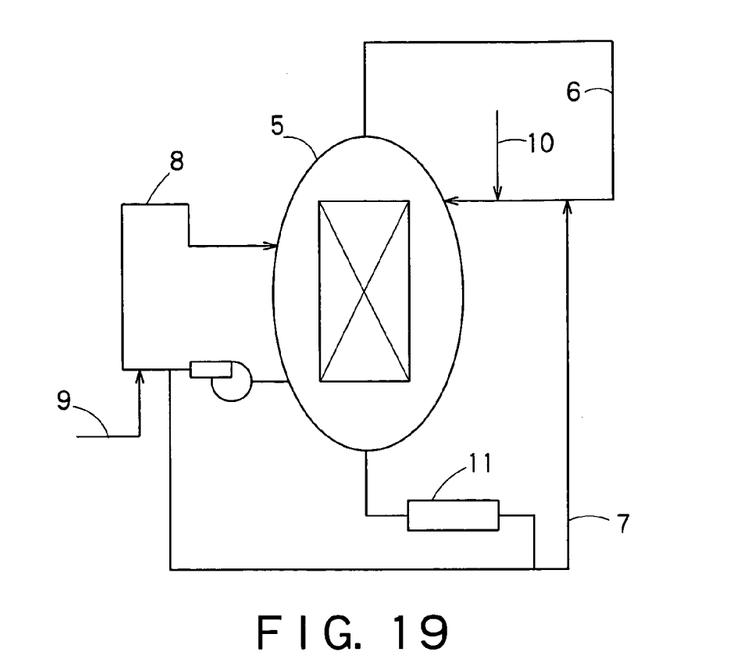
FIG. 19 is diagrammatic view of a BWR nuclear plant with a hydrogen/alcohol injecting system.

FIG. 19 is diagrammatic view of a hydrogen/alcohol injecting system. The hydrogen concentration of the reactor water can be effectively increased by injecting hydrogen through a feedwater system injection line connected to a low-pressure part of a feedwater line into the nuclear reactor. The same effect as that of increased hydrogen concentration can be achieved by injecting a liquid having alcohol groups, such as methanol, into the nuclear reactor. Hydrogen or the liquid can be injected into the nuclear reactor through a feedwater system injection line 10 or a recirculation system injection line 9 connected to a recirculation line 8.

Figure 20:
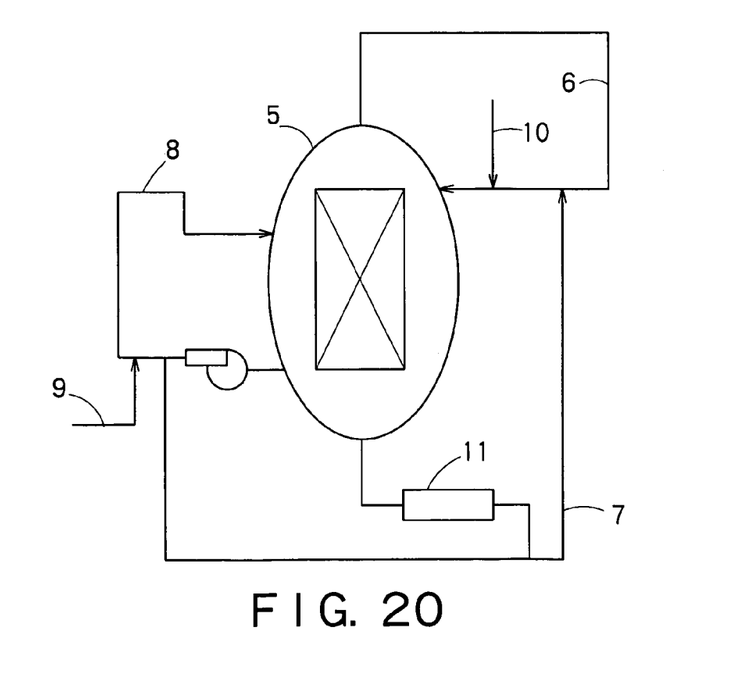
FIG. 20 is a diagrammatic view of a BWR nuclear plant.

FIG. 20 is a diagrammatic view of a BWR nuclear plant including a pressure vessel 5, a feedwater line 6, a purifying system 7, a recirculation line 8 and a corrosion potential measuring apparatus 11. A noble metal composition injecting line 9 is connected to the recirculation line 8 to inject a noble metal composition into the reactor water. The reactor water is supplied to the corrosion potential measuring apparatus 11. The corrosion potential measuring apparatus 11 measures corrosion potential in the high-temperature reactor water. When applying a noble metal to a reactor structural member, the noble metal composition injection lines 9 is actuated to inject the noble metal composition into the reactor water. The noble metal composition may be injected into the reactor water while the nuclear reactor is in normal operation, while the nuclear reactor is stopped or while the nuclear reactor is in a start-up stage, provided that an objective part of the reactor structural member to be subjected to corrosion potential reduction is exposed to the reactor water. The relation between injection time, temperature and concentration may be determined beforehand through experiments and the relation may be used for controlling a noble metal composition injecting operation or the noble metal composition injecting operation may be controlled by monitoring the process of the noble metal composition injecting operation by the corrosion potential measuring apparatus 11 and the noble metal composition may be injected into the reactor water confirming the reduction of corrosion potential.

Although the noble metal composition is injected into the reactor water through the recirculation system in this embodiment, the noble metal composition may be injected into the reactor water through any part connected to the nuclear reactor, such as a feedwater system, a residual heat removing system, a nuclear reactor cleaning system, a sampling line or the like. The noble metal composition may be introduced into the nuclear reactor by a method that holds a sintered noble metal composition compact that discharges a noble metal composition in the nuclear reactor. The BWR nuclear plant has a purifying system for reducing the iron concentration of the feedwater to a sufficiently low level. A small amount of hydrogen is injected into the nuclear reactor to make the noble metal exercise its catalytic effect.

As is apparent from the foregoing description, according to the present invention, the corrosion potential of the reactor structural member can be reduced without injecting hydrogen into the reactor water or by injecting a small amount of hydrogen into the reactor water to extend the life of the reactor structural member.

It is possible to suppress the increase of the dose rate of the turbine system due to migration of volatile ammonia produced by the reaction of hydrogen injected into the nuclear reactor with N-16 produced by nuclear reaction. Therefore, various facilities to reduce excess hydrogen in the off-gas system by recombination can be reduced.

Furthermore, since only a very small amount of the noble metal is necessary, the oxidation and hydrogenation of the fuel material are not promoted substantially.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A method of suppressing corrosion of a reactor structural member of a water-cooled nuclear reactor, comprising:
   controlling a corrosion potential of the reactor structural member by providing a corrosion potential reducing substance on a surface of the reactor structural member, the corrosion potential reducing substance being a photocatalytic substance which produces an electromotive force under an irradiation of a light or a radioactive ray in the water-cooled nuclear reactor, the corrosion potential reducing substance being formed as particles made of $TiO_2$ prior to introduction into water which is a coolant of the water-cooled nuclear reactor, each particle having a surface on which at least one of Pt, Rh, Ru and Pd is provided,
   wherein a solution or a suspension of a composition containing the photocatalytic substance is added to the water of the water-cooled nuclear reactor so as to make the photocatalytic substance adhere to the surface of the reactor structural member or to form a film of the photocatalytic substance on the surface of the reactor structural member, and
   wherein the reactor structural member is made of an iron-base or nickel-base alloy, and the corrosion potential reducing substance is formed on a corrosion oxide film formed on the surface of the reactor structural member.

2. The method according to claim 1, wherein the water-cooled nuclear reactor is a boiling water reactor, and the water is a feedwater which is a coolant of the boiling water reactor,
   the method further comprising controlling an iron concentration of the feedwater in the boiling water reactor.

3. The method according to claim 1, wherein the corrosion potential reducing substance is formed on the surface of the reactor structural member as a film having a thickness in a range of 0.1 to 1 $\mu$m.

4. The method according to claim 1, wherein the corrosion oxide film has an outer layer having a property of an n-type semiconductor and an inner layer having a property of a p-type semiconductor, or has a single layer having a property of a p-type semiconductor.

5. The method according to claim 4, wherein, when the corrosion oxide film has the outer layer having a property of an n-type semiconductor and the inner layer having a property of a p-type semiconductor, the corrosion potential reducing substance is formed on the corrosion oxide film of the reactor structural member after making the outer layer unstable by increasing a hydrogen concentration of the water or after removing the outer layer by a decontamination process.

6. The method according to claim 5, wherein the outer layer having a property of an n-type semiconductor is removed by a chemical decontamination process, an electrolytic decontamination process or a laser decontamination process.

7. The method according to claim 6, wherein the outer layer having a property of an n-type semiconductor is removed by irradiating the outer layer with a laser light in a water.

8. The method according to claim 1, wherein the water-cooled nuclear reactor is a boiling water reactor including a nuclear fuel and a condensing system in which a purifier is placed, and the water is a feedwater which is a coolant of the boiling water reactor, and wherein a loose deposition of a hematite on a surface of the nuclear fuel is suppressed by controlling an iron concentration of the feedwater in the boiling water reactor by the purifier placed in the condensing system of the boiling water reactor.

9. The method according to claim 8, wherein the purifier includes a filter device and a demineralizer device.

10. The method according to claim 1, wherein the water-cooled nuclear reactor is a boiling water reactor including a feedwater system, and the water is a feedwater which is a coolant of the boiling water reactor, the method further comprising injecting hydrogen or methanol through the feedwater system of the boiling water reactor into the feedwater.

11. A method of suppressing a corrosion of a reactor structural member of a water-cooled nuclear reactor which is a boiling water reactor including a nuclear fuel, comprising:

controlling an iron concentration of a feedwater which is a coolant of the boiling water reactor so that a hematite in a loose deposition is not produced on a surface of the nuclear fuel;

depositing at least one of Pt, Rh, Ru and Pd on a corrosion oxide film formed on a surface of the reactor structural member in a mass per unit area of 0.1 $\mu g/cm^2$; and controlling a quality of the coolant so that the coolant has an oxygen/hydrogen molar ratio in a range of 0.4 to 0.5.

12. A method of suppressing corrosion of a reactor structural member of a water-cooled nuclear reactor, comprising:

controlling a corrosion potential of the reactor structural member by providing a corrosion potential reducing substance on a surface of the reactor structural member, the corrosion potential reducing substance being selected from the group consisting of a photocatalytic substance which produces an electromotive force under an irradiation of a light or a radioactive ray in the water-cooled nuclear reactor and a metal or a metal compound which forms the photocatalytic substance under a condition specified by a temperature and a pressure in the water-cooled nuclear reactor, the corrosion potential reducing substance being formed as particles made of $TiO_2$, each particle having a surface on which at least one of Pt, Rh, Ru and Pd is provided, the one of Pt, Rh, Ru and Pd being provided on a Ti particle prior to introduction of the particle into water which is a coolant of the water-cooled nuclear reactor.

13. A method of suppressing corrosion of a reactor structural member of a water-cooled nuclear reactor, comprising:

substantially reducing a corrosion potential of the reactor structural member by providing a corrosion potential reducing substance on a surface of the reactor structural member, the corrosion potential reducing substance being a photocatalytic substance which produces an electromotive force under an irradiation of a light or a radioactive ray in the water-cooled nuclear reactor, the corrosion potential reducing substance being formed as particles made of $TiO_2$ prior to introduction into water which is a coolant of the water-cooled nuclear reactor and introduced into the water-cooled nuclear reactor with the water, each particle having a surface on which at least one of Pt, Rh, Ru and Pd is provided.

14. The method according to claim 13, wherein substantial quantities of particles made of $TiO_2$ are present in the corrosion potential reducing substance.

15. The method according to claim 13, wherein a solution or a suspension of a composition containing the photocatalytic substance is added to the water of the reactor to form a film of the photocatalytic substance on the structural member as a result of the addition of the solution or suspension to the water of the reactor.

16. The method according to claim 15, wherein the film has a thickness of 0.1 micrometers to 1 micrometers.

17. The method according to claim 1, wherein the corrosion potential reducing substance is adhered to the surface of the reactor structural member.

18. The method according to claim 13, wherein the corrosion potential reducing substance is adhered to the surface of the reactor structural member.

* * * * *